US008725655B2

(12) United States Patent
Harbaugh

(10) Patent No.: US 8,725,655 B2
(45) Date of Patent: *May 13, 2014

(54) METHOD FOR ADMITTING AN ADMISSIONS APPLICANT INTO AN ACADEMIC INSTITUTION

(71) Applicant: Nova Southeastern University, Fort Lauderdale, FL (US)

(72) Inventor: Joseph Harbaugh, Weston, FL (US)

(73) Assignee: Nova Southeastern University, Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/075,725

(22) Filed: Nov. 8, 2013

(65) Prior Publication Data
US 2014/0067707 A1 Mar. 6, 2014

Related U.S. Application Data

(63) Continuation of application No. 09/826,690, filed on Apr. 5, 2001.

(51) Int. Cl.
G06Q 99/00 (2006.01)

(52) U.S. Cl.
USPC .......................................................... 705/327

(58) Field of Classification Search
USPC .......................................................... 705/327
See application file for complete search history.

(56) References Cited

U.S. PATENT DOCUMENTS

| 6,088,686 A | 7/2000 | Walker et al. |
| 6,146,148 A | 11/2000 | Stuppy |
| 2001/0044728 A1 | 11/2001 | Freeman et al. |
| 2002/0174123 A1 | 11/2002 | Harbaugh |

FOREIGN PATENT DOCUMENTS

GB 2209862 5/1989

OTHER PUBLICATIONS

Jacques Steinberg with Edward Wyatt, Boola, Boola: E-Commerce Comes to the Quad, New York Times on the Web, Feb. 13, 2000 at 1-4.
Law School Admission Council, Law Services Cautionary Policies Concerning LSAT® Scores and Related Services, Revised, Dec. 1999.
Law School Admission Council, Inc., Law Services Report, Sep./Oct. 1997, Copyright 1997.
Law School Admission Council, New Models to Assure Diversity, Fairness and Appropriate Test Use in Law School Admissions, Oct. 1999 at 1-33.
Law School Admission Council, LSAT & LSDAS Registration & Information Book, Copyright 2000 at 121-122.
www.swt.edu; graduate catalog retrieved from way back machine dating Mar. 4, 2000. Retrieved on Aug. 9th, 2004.

(Continued)

Primary Examiner — Traci Casler
(74) Attorney, Agent, or Firm — Nixon & Vanderhye, P.C.

(57) ABSTRACT

A method for admitting applicants into an academic institution can include the steps of: compiling a list of standardized test takers who have applied for admission to at least one academic institution, but have not received an offer of admission to any one of the at least one academic institutions; conditionally admitting selected ones of the test takers to an abbreviated academic program; subjecting the conditionally admitted test takers to at least one examination during the abbreviated academic program, each conditionally admitted test taker achieving a score on the at least one examination; and, admitting into the academic institution those conditionally admitted test takers who achieve a score on said at least one examination which satisfies an admissions criteria.

30 Claims, 5 Drawing Sheets

(56) References Cited

OTHER PUBLICATIONS

New Models to Assure Diversity, Fairness and Appropriate Test Use in Law School Admissions. Oct. 1999. The Law School Admission Council. Acquired from STIC Search before transferred to Business methods also entered in 1OS.

Arenson, Karen, "Opponents of a Change in CUNY Admissions Policy Helped Pass a Compromise Plan", The New York Times, Late Edition, Nov. 24, 1999, p. 83.

Nova Southeastern University (NSU) Shepard Broad Law Center—Admissions (possibly at least as early as Jan. 18, 2000). http://web.archive.org/web/20000118070547/http://nsulaw.nova.edu/Admissions/default.htm (4 pages).

www.lasalle.edu Academic Discovery services; any linkages archive.org, Jun. 6, 2000.

www.collegeboard.com; retrieved wayback machine Feb. 3, 1999. Declaration; Traci Casler; Aug. 20, 2007.

Arenson, Karen W; Opponents of Change in CUNY Admissions Policy Helped Pass a Compromise Plan; New York Times; Nov. 24, 1999.

www.gradcollege.stw.edu, retrieved from archive.org any linkage Feb. 29, 2000.

www.swt.edu, retrieved Feb. 29, 2000; additional pp. 14-18 added for new limitation.

Joseph Harbaugh, "Shepard Broad Law Center's Conditional Admissions Program Prior to Apr. 5, 2000," (unpublished description).

METHOD FOR ADMITTING AN ADMISSIONS APPLICANT INTO AN ACADEMIC INSTITUTION

CROSS-REFERENCE TO RELATED APPLICATION

This application is a continuation of application Ser. No. 09/826,690 filed Apr. 5, 2001, the entire content of which is hereby incorporated by reference in this application.

TECHNICAL FIELD

This invention relates to the field of school admissions and more particularly to a method for identifying candidates for admission to an educational institution.

BACKGROUND AND SUMMARY

Each year, thousands of candidates apply for admission to academic institutions such as undergraduate and graduate schools. Each academic institution, however, typically has substantially fewer open slots to fill with new students than applicants seeking to fill those slots. Accordingly, for most academic institutions, the majority of applicants are denied admission. In order to differentiate between those applicants to whom offers of admission should be extended and those applicants for whom requests for admission should be denied, academic institutions typically compare established criteria with a combination of grade point average (GPA), standardized test scores and demographic profiling to individually evaluate each admissions candidate. Additionally, some academic institutions also consider personal statements, essays, audiovisual material, and the like to further assist in the evaluation process.

In the past, academic institutions have analyzed the admissions pattern of standardized test takers to better characterize particular candidates for admission. For instance, it is well known that many academic institutions, such as law schools, aggressively market particular students who have scored well on the law school admissions test (LSAT). Similarly, some undergraduate colleges solicit applications from those students who have performed well on the scholastic aptitude test (SAT). Still, to date academic institutions have not analyzed the acceptance/denial rate of particular test takers to determine whether certain test takers have heretofore been successful in gaining admission to a desired academic program.

In particular, it can be said that test takers who have received more offers for admission than rejections have associated therewith a GPA and standardized test score sufficient to gain admissions to a select group of academic institutions. Without more, however, it cannot be said whether such a student will be a successful student once enrolled in a desired academic program. Conversely, test takers who have received far more rejections than offers for admission likely have associated therewith a GPA and standardized test score which is insufficient to gain admission to most any of a select group of academic institutions. As before, however, without more it cannot be said whether such a student will be a successful student if enrolled in a desired academic program.

Notwithstanding this reasoning, in view of the overwhelming number of applicants seeking admission to any one academic institution, a great number of admissions officers rely upon standardized testing to at least narrow the field of candidates for whom a more detailed analysis can be applied. For instance, those candidates having standardized test scores and a GPA which far exceed a preferred criteria can be extended an offer of admission without further consideration. Conversely, those candidates having standardized test scores and a GPA falling below a minimum criteria are often afforded mere cursory consideration before being denied admission. In many cases, only those students having standardized test scores and a GPA falling within a preferred range are afforded full admissions committee consideration.

Notably, it is a stated goal of many graduate school admissions officers to take into account attributes in addition to academic prowess that individual applicants can bring to a class. Specifically, many admissions officers aim to assemble the best class, as opposed to simply admitting the "best" individual applicants as measured solely by grades and standardized test scores. This stated aim of admissions officers is frustrated, however, by the natural reliance on standardized test scores and GPAs in order to narrow the field of candidates for whom a more detailed analysis can be applied. Accordingly, many potential students who would otherwise succeed in an academic institution are overlooked in favor of those potential students possessing preferred numeric credentials.

Though a conventional admissions analysis can suffice for many students, there remain those students who are unfairly characterized by standardized testing scores and GPAs. Despite a poor testing skills, many candidates are excellent students who otherwise can be valuable additions to an entering class of students. Many academic institutions have realized that the conventional admissions analysis can have an undesirable impact on otherwise qualified students. For example, the University of Miami has implemented a conditional acceptance program in which marginal students are invited to participate in an abbreviated academic program subsequent to the successful completion of which those marginal students are permanently admitted to the school. Nevertheless, only those students who have already applied for admission to the University of Miami are eligible to participate in the conditional acceptance program. Moreover, this type of conditional acceptance program only takes into account the deficiencies of a students academic record which in of itself, cannot identify a student who is not able otherwise to gain admission to an academic institution.

A method for admitting applicants into an academic institution in accordance with the inventive arrangements can assist admissions officers with identifying those admissions candidates possessing sub-par numeric credentials who would otherwise succeed as a student in an academic institution. In particular, the method can be used first to identify students who have expressed an interest in attending particular academic institution, but have heretofore been largely unsuccessful in gaining admission to most if not all of the academic institutions to which the students have applied. Second, those students can conditionally enroll in an abbreviated academic program in which the enrolled students can be evaluated based upon an examination process. Conditionally enrolled students who successfully complete the abbreviated academic program are determined to possess the ability to succeed as students in the academic institution and can be permanently enrolled therein.

In one aspect of the present invention, a method for admitting applicants into an academic institution can include the steps of: compiling a list of standardized test takers who have applied for admission to at least one academic institution, but have not received an offer of admission to any one of the at least one academic institutions; conditionally admitting selected ones of the test takers to an abbreviated academic program; subjecting the conditionally admitted test takers to at least one examination during the abbreviated academic program, each conditionally admitted test taker achieving a score on the at least one examination; and, admitting into the academic institution those conditionally admitted test takers who achieve a score on the at least one examination which satisfies an admissions criteria.

The step of conditionally admitting selected ones of the test takers to an abbreviated academic program can include the steps of: computing a shifting range of standardized test scores and grade point averages (GPAs) for the test takers; identifying those test takers having a standardized test score and GPA falling within the shifting range; and, conditionally admitting the identified test takers. The subjecting step can include the steps of administering at least one examination to the conditionally admitted test takers during the abbreviated academic program; scoring the at least one examination based on a calibrated grading process; and, for each conditionally admitted test taker, combining scores for the at least one examination, the combined scores forming a composite score. In addition, the subjecting step also can include the steps of: delivering a final examination on-line to conditionally admitted test takers situated in a remote testing facility; proctoring the examination at the remote testing facility; and, factoring resulting scores for the final examination into the composite score. Finally, the step of admitting into the academic institution those conditionally admitted test takers who achieve a score on the at least one examination which satisfies an admissions criteria can include the step of admitting into the academic institution those conditionally admitted test takers whose composite score exceeds a pre-determined composite score.

Notably, the method of the invention also can include the step of providing asynchronous instruction in at least one academic discipline to the conditionally admitted test takers. In particular, the step of providing asynchronous instruction can include the steps of: delivering electronic instructional content to remotely situated conditionally admitted test takers; receiving classroom work-product from the remotely situated conditionally admitted test takers; and, forwarding the received classroom work-product to at least one instructor. Likewise, the method of the invention also can include the step of providing synchronous instruction in at least one academic discipline to the conditionally admitted test takers. The step of providing synchronous instruction can include the steps of: delivering on-line instructional content to remotely situated conditionally admitted test takers; and, moderating on-line participation between the remotely situated conditionally admitted test takers and at least one instructor.

The method of the invention can find particular application to the field of law school admissions. Accordingly, in a particular aspect of the present invention, the compiling step can include the step of compiling a list of Law School Admissions Test (LSAT) test takers who have applied for admission to at least one law school, but have not received an offer of admission to any one of the at least one law schools. In addition, the step of conditionally admitting selected ones of the test takers to an abbreviated academic program can include the steps of: computing a shifting range of LSAT scores and undergraduate grade point averages (UGPAs) for the test takers; identifying those LSAT test takers having an LSAT score and UGPA falling within the shifting range; and, conditionally admitting the identified test takers to an abbreviated law school program. Finally, the subjecting step can include administering at least one law school examination to the conditionally admitted LSAT test takers during the abbreviated academic program; scoring the at least one law school examination based on a calibrated grading process; and, for each conditionally admitted LSAT test taker, combining scores for the at least one law school examination, the combined scores forming a composite score.

In a second aspect of the present invention, a method for admitting applicants into an academic institution can include the steps of: identifying among a selection of standardized test takers, those test takers who have applied for admission to at least one academic institution and have received more rejections than offers of admission from the at least one academic institutions; extending to the identified test takers an offer of conditional admittance to the academic institution; enrolling in the academic institution at least one of the identified test takers who have accepted the extended offer; subjecting the at least one enrolled test taker to at least one examination; and grading the at least one examination, wherein the grading produces an examination score for the at least one enrolled test taker. Enrolled test takers who achieve an examination score which exceeds a pre-defined level are permitted to remain enrolled in the academic institution.

The extending step can include the steps of: computing a shifting range of standardized test scores and grade point averages (GPAs) for the test takers; selecting particular test takers having a standardized test score and GPA falling within the shifting range; and, extending to the selected particular test takers an offer of conditional admittance to the academic institution. The grading step can include the steps of: calibrating graders in a grading process; and, subjecting the at least one examination to the grading process, the grading process producing an examination score for the at least one enrolled test taker.

Notably, the method of the invention also can include the step of providing asynchronous instruction in at least one academic discipline to the enrolled test takers. In particular, the step of providing asynchronous instruction can include the steps of: delivering electronic instructional content to remotely situated enrolled test takers; receiving classroom work-product from the remotely situated enrolled test takers; and, forwarding the received classroom work-product to at least one instructor. Likewise, the method of the invention also can include the step of providing synchronous instruction in at least one academic discipline to the enrolled test takers. The step of providing synchronous instruction can include the steps of: delivering on-line instructional content to remotely situated enrolled test takers; and, moderating on-line participation between the remotely situated enrolled test takers and at least one instructor.

Importantly, the method of the invention can have broad application to a variety of graduate and undergraduate academic institutions. In particular, the method of the invention can be used to admit applicants to law schools, medical schools, schools of dental medicine, schools of veterinary medicine, pharmacy schools, business schools, etc. In view of these particular applications, the identifying step of the present invention can include the steps of: reviewing a selection of test takers who have taken one of the law school admissions test (LSAT), medical college admissions test (MCAT), dental admissions test (DAT), veterinary college admissions test (VCAT), pharmacy college admissions test (PCAT), allied health programs admissions test (AHPAT), graduate record examination (GRE), and the graduate management admission test (GMAT); and, identifying among the selection, those test takers who have applied for admission to at least one graduate school and have received more rejections than offers of admission from the at least one graduate schools.

In a third aspect of the present invention, a method for admitting applicants into an academic institution can include the steps of: compiling a list of standardized test takers who have applied for admission to at least one academic institution, but have not received an offer of admission to any one of the at least one academic institutions; electronically registering selected ones of the test takers in an abbreviated academic program; administering at least one examination over a computer communications network to the registered test takers during the abbreviated academic program, each registered test taker achieving a score on the at least one examination; and, electronically enrolling in the academic institution those registered test takers who achieve a score on the at least one examination which exceeds a pre-determined score. The method of the third aspect of the present invention can be embodied in a machine readable storage having stored thereon a computer program for admitting applicants into an academic institution. The computer program can have a plurality of code sections executable by a machine for causing the machine to perform the steps of the method. For instance, the machine readable storage can be a fixed storage such as a hard disk drive (HDD), compact disk (CD-ROM) or digital versatile disk (DVD).

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION

In the method of the invention, a pool of standardized test takers can be analyzed. A typical standardized test can include the scholastic aptitude test (SAT), law school admission test (LSAT), graduate record examination (GRE), and the like. As is the case with most standardized tests, test taker demographics can be collected and provided to the admissions offices of selected academic institutions. From the demographics and admission records, it can be determined whether a test taker has successfully gained entrance into at least one academic institution of choice. Thus, an analysis of the demographic data can be used to identify particular test takers who have applied for admission to at least one academic institution, but have not received an offer of admission to any academic institutions. A typical academic institution can include an undergraduate college, law school, or other graduate school.

Figure 1:
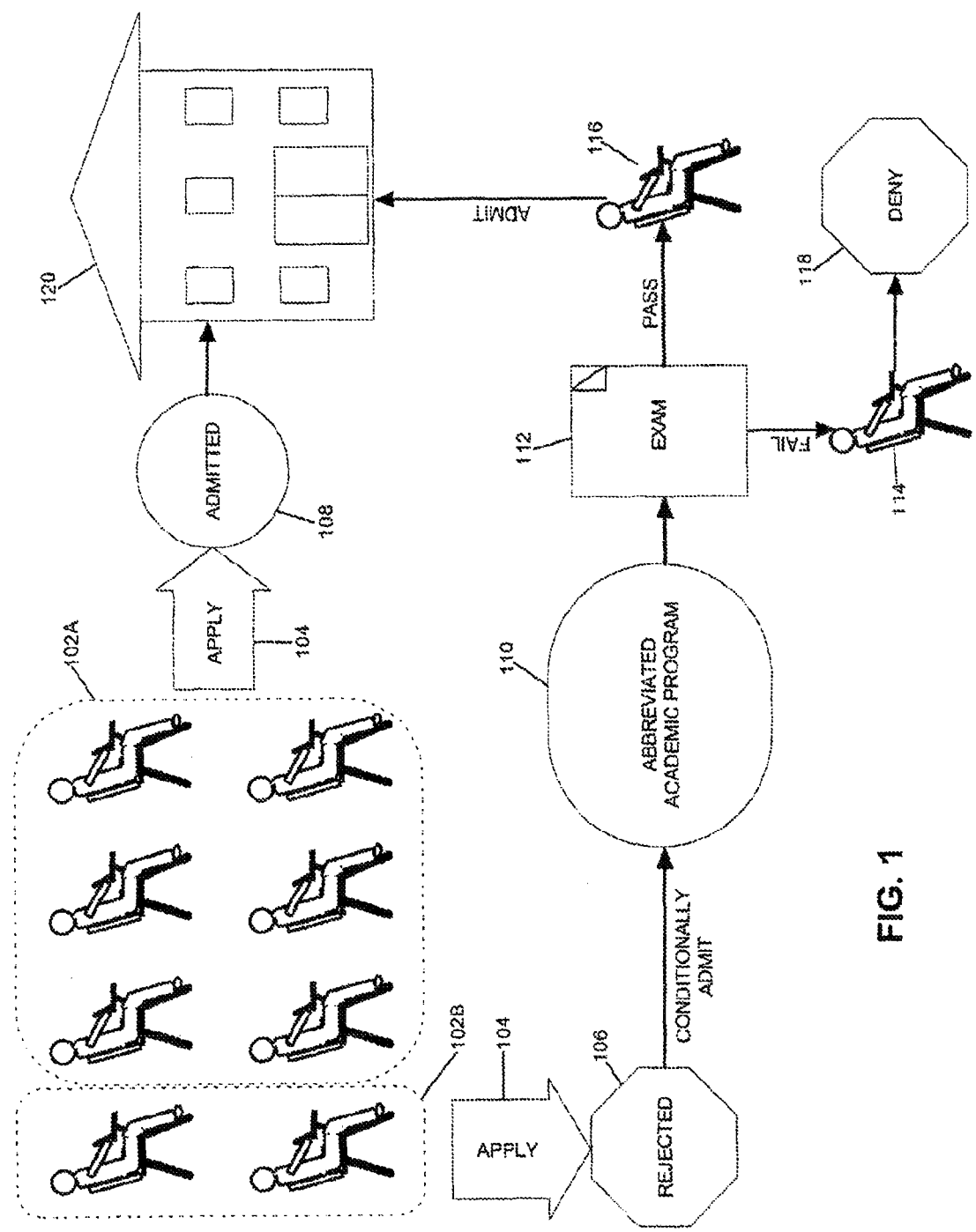
FIG. 1 is a pictorial representation of a process for identifying admissions candidates who are poorly credentialed, but are likely to succeed as students in an academic institution.

FIG. 1 is a pictorial illustration of a method for admitting applicants into an academic institution. As shown in FIG. 1, test takers 102A, 102B can submit one or more applications for admission 104 to one or more academic institutions 120. Many test takers 102A will gain admission 108 to one more academic institutions 120. Still, a smaller group of test takers 102B will primarily receive rejection notices 106 from academic institutions to which the smaller group 102B applied. Presumably, each applicant in the smaller group 102B has associated therewith an insufficient GPA and standardized test score. Yet, from this information alone, it is not possible to determine conclusively whether the smaller group of test takers 102B will succeed or fail as students enrolled in an academic program of choice.

In accordance with the inventive arrangements, the GPA and standardized test score of each student in the smaller group of test takers 102B can be analyzed against a shifting range of standardized test scores and GPAs. If the student's numeric qualifications are determined to fall within the shifting range, the student can be conditionally admitted to an abbreviated academic program 110. An abbreviated academic program 110 can include a shorter term academic program in which at least one class in a selected academic discipline can be taught. An example of an abbreviated academic program can be a conditional summer program in which a set of five to seven week courses can be taught in accordance with traditional teaching methods. During the abbreviated academic program 110 one or more examinations 112 can be administered to the conditionally admitted students. The students 114 who fail to achieve a satisfactory score in the administered exams 112 are denied entry 118 into the academic institution 120. Conversely, those students 116 who achieve a satisfactory score in the administered exams 112 are deemed students who possess insufficient numerical qualifications, but will likely succeed as enrolled students in the academic institution 120. Accordingly, the passing students 116 are permanently admitted to the academic institution 120.

One skilled in the art will recognize that as depicted in FIG. 1, a student who is initially rejected from an academic institution 120 can subsequently gain admission to the same academic institution 120 through the method of the invention. Though in one aspect of the invention this is a possibility, the invention is not limited in this regard. Rather, the invention also contemplates a student who has been rejected from multiple academic institutions and subsequently, by virtue of the method of the invention, permanently enrolls in an academic institution for which the student had not initially applied for admission.

Figure 2:
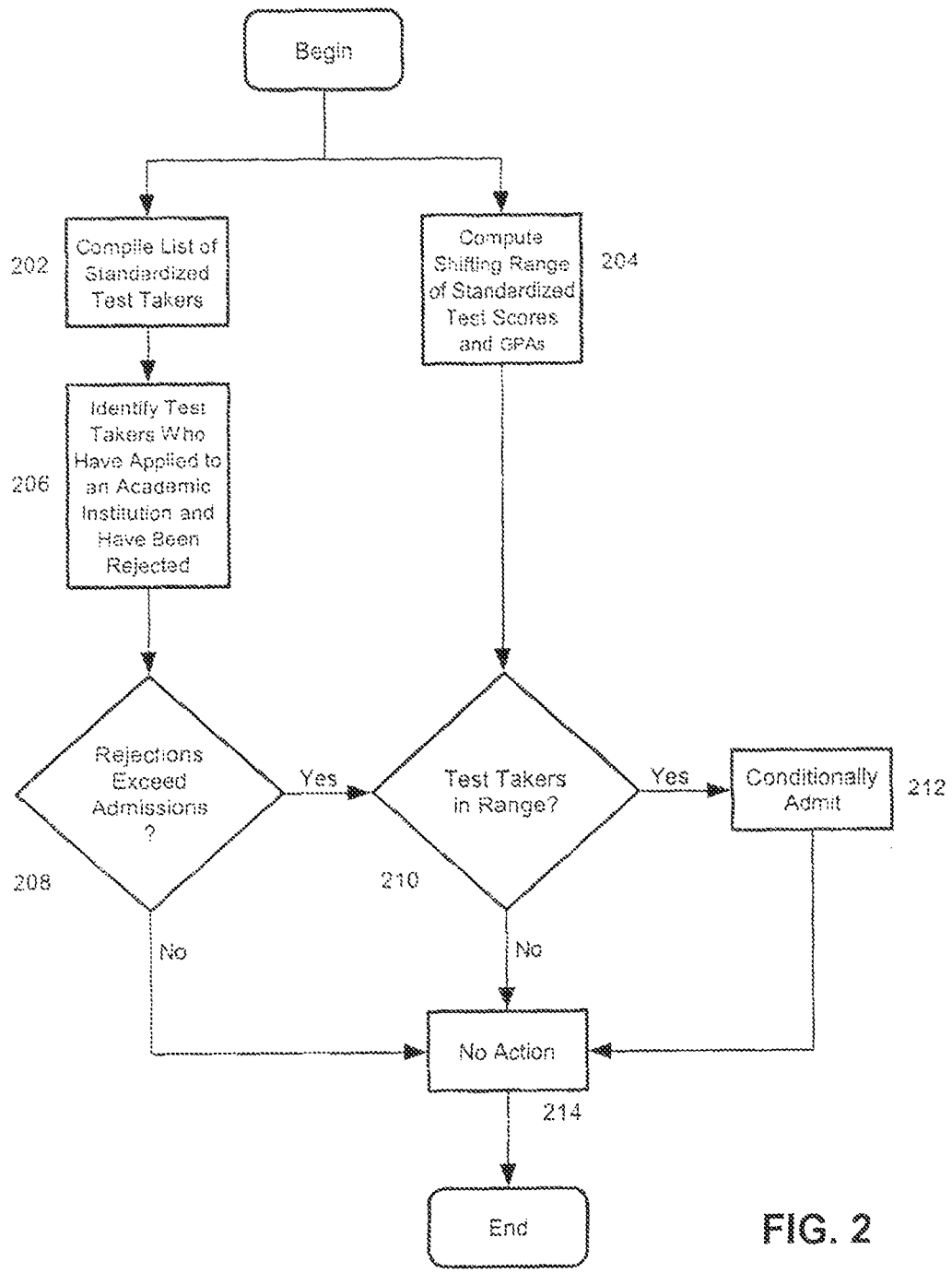
FIG. 2 is a flow chart illustrating a process for identifying potential enrollees in an abbreviated academic program.

FIG. 2 is a flow chart illustrating a process for identifying potential enrollees in the abbreviated academic program 110 of FIG. 1. Initially, in block 204, a shifting range of standardized test scores and GPAs can be computed. The use of shifting ranges to categorize applicants is well known among admissions officers. Typically, the shifting range can include several categories of GPA and standardized test score criteria. At one extreme, a category in the range can include those test takers having very high standardized test scores, but GPAs which range from low to high. At another extreme, a category in the range can include those test takers having very high GPAs, but standardized test scores which range from low to high. At the middle of the range, categories can include intermediate standardized test scores and GPAs.

In law school admissions, it is known to compute a shifting range of standardized test scores based not only on reported undergraduate GPAs and LSAT scores, but also on GPAs as reported by a law school applicant data collection services known to in the legal community as the Law School Data Assembly Service (LSDAS). Hence, a valid shifting range for use in law school admissions can include the following sequence:

| LSAT Average | LSDAS GPA | Self-Reported GPA |
|---|---|---|
| 130-135 | 2.80-4.33 | 3.00-3.49, 3.50-3.74, 3.75+ |
| 136-140 | 2.60-4.33 | 3.00-3.49, 3.50-3.74, 3.75+ |
| 141-145 | 2.25-2.80 | 2.50-2.99 |

Once the range has been computed, in block 202, a list of standardized test takers can be compiled and in block 206, a subset of test takers can be selected which includes those test takers who have applied to one or more academic institutions and have been rejected. In decision block 208, an additional subset can be selected which includes those test takers who have failed to gain admission to most of the academic institutions to which the test takers have applied. This particular demographic can signify to an admissions officer a particular admissions candidate who has a strong desire to attend an academic institution, but who also lacks strong enough numerical qualifications to gain admission to most academic institutions. Without more information, however, it is not possible for an admission officer to determine whether such an admissions candidate can succeed as an enrolled student.

In decision block 210, the numeric qualifications of each student in the additional subset can be analyzed to determine whether each applicant's GPA and standardized test scores fall within the shifting range computed in block 204. Recognizing the correlation between extremes in numeric qualifications and academic performance, those candidates having combined numeric attributes lying outside the computed range are statistically determined to be incapable of succeeding as an enrolled student in an academic institution. In contrast, if the numeric qualifications of each student in the additional subset fall within the shifting range computed in block 204, in block 212 the students can be conditionally admitted to the abbreviated program 110 of FIG. 1. Otherwise, in block 214 no action is taken in respect to the student.

Notably, the process illustrated in FIG. 2 can be used by non-traditional academic institutions to identify a market of students who would like to participate in a particular type of academic program, but are incapable of gaining admission to a traditional academic institution. For example, a test taker who has associated therewith a poor undergraduate GPA and an unsatisfactory GRE score and who has been unable to gain admittance to any graduate school can be identified as an ideal potential applicant for a non-traditional, distance learning program. Referred to in the art as "mail-order" degree programs, presently, these non-traditional programs do not have the ability to identify this type of candidate. Rather, mail-order degree programs typically rely upon generic advertising such as can be seen in airline periodicals. Armed with the method of the invention, however, such non-traditional programs can directly solicit an admissions candidate having the most interest in such a non-traditional degree program.

Figure 3:
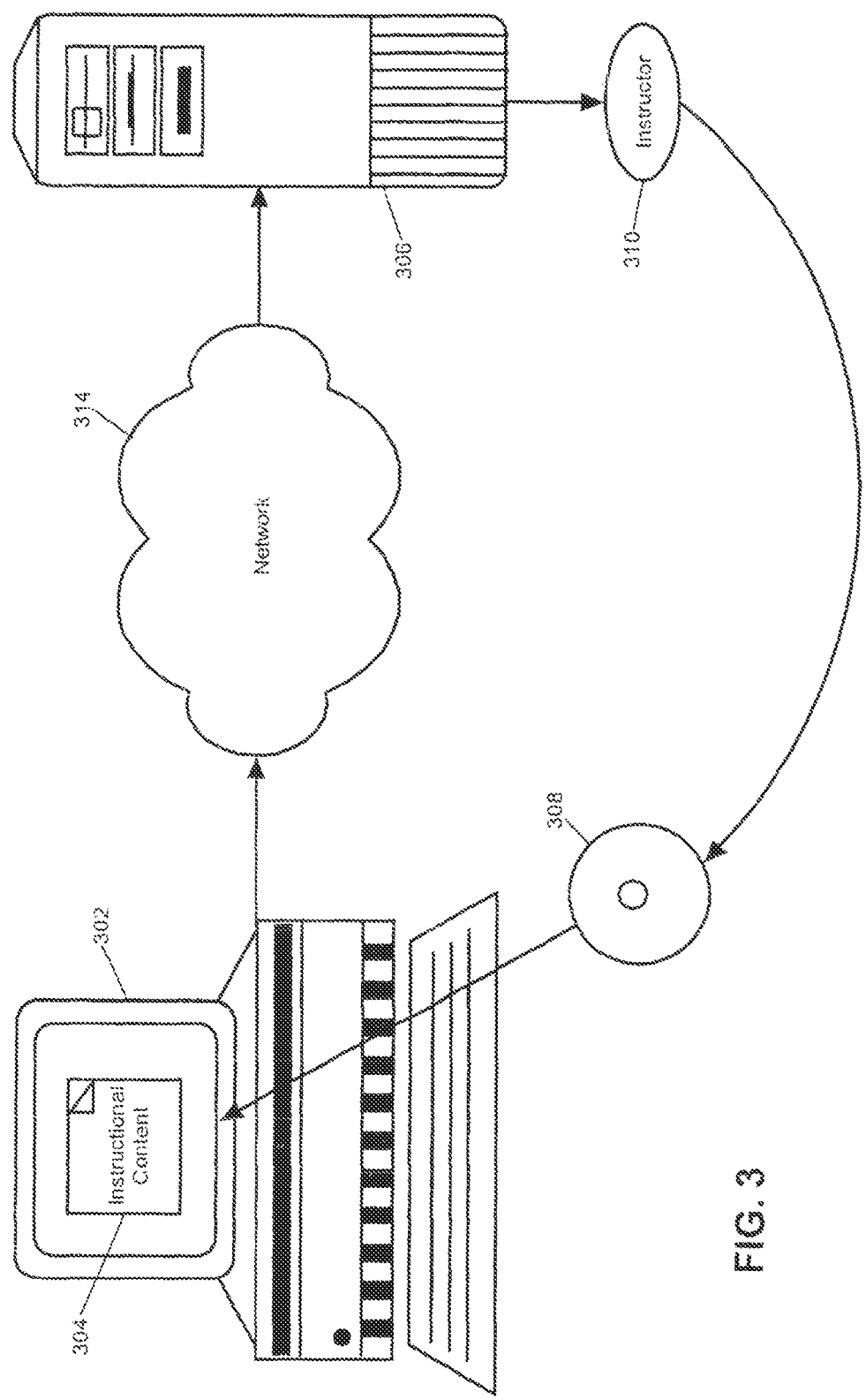
FIG. 3 is a schematic illustration of an asynchronous instruction system.

Once enrolled in an abbreviated academic program, enrollees can receive instruction in a particular academic discipline, and the success of each enrollee can be evaluated based on examination scores. Notably, the delivery of instructional content is not limited in the present invention to on-campus instruction. Rather, the method of the invention can be adapted to include a distance learning feature. In particular, both asynchronous and synchronous instruction can be provided. FIG. 3 is a schematic diagram illustrating the method of the invention incorporating asynchronous instruction.

As shown in FIG. 3, during the course of the abbreviated academic program, an instructor 310 can provide to a student instruction content 304. Instructional content 310 can include lectures, class notes, reading materials, and the like. Additionally, the instructional content 310 can include audiovisual materials such as recorded audio and video of a lecture, as well as presentations, graphic illustrations, hyperlinks to supplemental information, and the like. Though not limited to any particular method for delivering the instructional content 310, in FIG. 3, it is shown that the instructional content 310 can be delivered to a remotely situated enrollee via compact disk or other storage media. Notwithstanding, the instructional content 310 also can be delivered through any other suitable mechanism including on-line downloading or via post.

In one aspect of the present invention, remotely situated enrollees can view the instructional content 310 using a content browser executing in a computer 302, such as a word processor, presentation program, or Web browser. Additionally, remotely positioned enrollees can interact with the instructional content 310 and can submit classroom work-product to the instructor 310 through a computer communications network 314 such as the Internet. In that case, the work-product of the remotely positioned enrollee can be provided over the network 314 to a server 306. The server 306 can forward the work-product to the instructor 310 using any conventional means ranging from merely storing the work-product in an accessible director, to e-mailing the work-product to an e-mail address associated with the instructor 310.

Figure 4:
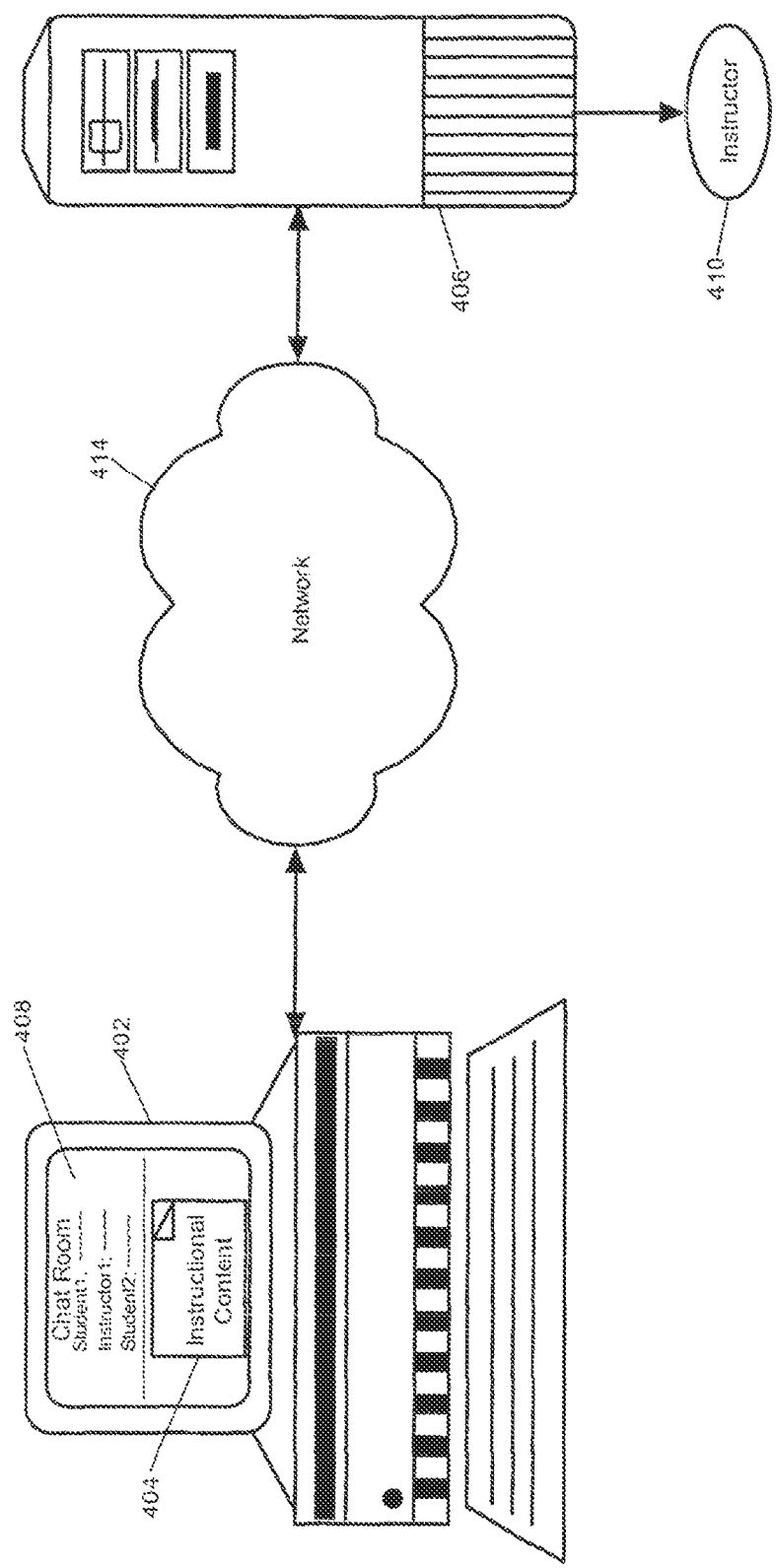
FIG. 4 is a schematic illustration of an on-line synchronous instruction system.

By comparison to FIG. 3, FIG. 4 is a schematic diagram illustrating the method of the invention incorporating synchronous instruction. In the case of synchronous instruction, instructional content 404 can be provided to the remotely position enrollee over the network 414. In addition, remotely positioned students can participate in a concurrent discussion of the instructional content 404 using a moderated forum such as a chat room 408. The chat room 408 can be moderated by the instructor 410 who can access the chat room 408 over the network 414. As in the case of asynchronous instruction, work-product can be uploaded to a server 406 and forwarded to the instructor 410. In this way, the experience of on-campus classroom instruction can be closely simulated on-line though each enrollee and the instructor can be geographically positioned miles apart.

Figure 5:
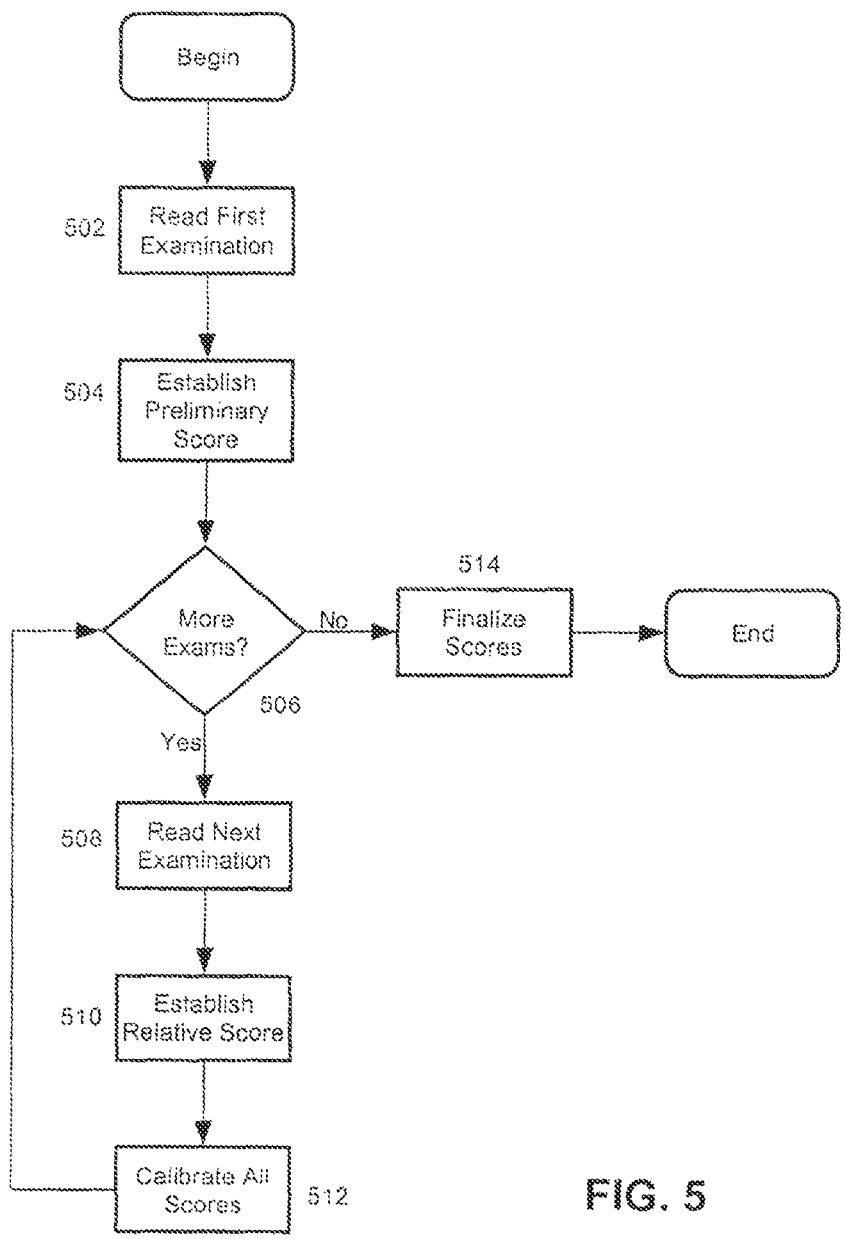
FIG. 5 is a flow chart illustrating a grading process for use with the method of the invention.

During the course of the abbreviated program, examinations can be administered to conditionally admitted enrollees to determine the academic performance thereof. Examinations can be administered using any conventional method, which can range from traditional in-classroom examinations, to proctored on-line examinations in a remote classroom, to remote examinations administered over a computer communications network such as the Internet. Subsequent to the administration of an examination, a calibrated grading process can be performed to ensure that all conditionally admitted enrollees are evaluated relative to one another. FIG. 5 is a flow chart illustrating a calibrated examination grading process suitable for use in the present invention.

In block 502 of FIG. 5, a first examination can be graded and in block 504, a preliminary score can be assigned to the first examination. Subsequently, in decision block 506, if there are more examinations to be graded, in block 508 a next examination can be read. In block 510, a relative score can be assigned to the examination which corresponds to the preliminary score of the first examination. Specifically, if the examination is determined to merit a better score than the first examination, than a relatively better score can be applied. The process can continue with a calibration process occurring periodically in step 512. Finally, in decision block 506, when no more examinations remain to be graded, the scores can be finalized in block 514 and the process can end.

Calibration processes are well-known in the art and are often used to ensure fairness in grading large quantities of essay-type examinations such as state Bar examinations. Calibration processes can be used both to calibrate the grading of examinations by multiple graders and by a single grader. In the case of a single grader, after one or more examinations have been scored, the scored examinations can be compared to one another to ensure that the range of scoring remains consistent with the merits of each graded examination. Similarly, in the case of multiple graders, after one or more examinations have been scored, the scored examinations of all graders can be compared to one another to ensure that individual graders apply consistent grading criteria to each examination.

In accordance with the inventive arrangements, one or more examinations can be provided during the course of the abbreviated academic program. In the case of a single examination, at the conclusion of the program, the scores of the conditionally admitted enrollees can be compared to a pre-determined score deemed to have a correlation with the likelihood of academic success associated with a student whose score exceeds the pre-determined score. Likewise, in the case of multiple examinations, at the conclusion of the program, the scores of the conditionally admitted enrollees can be combined into a composite score which can be compared to the pre-determined score. In any case, conditionally admitted enrollees having scores which exceed the pre-determined score can be identified as students having inadequate numerical qualifications, despite which such student is likely to succeed.

Accordingly, conditionally admitted enrollees having scores which satisfy an admissions criteria, for instance those scores which place the conditionally admitted enrollee within a certain percentile, or those scores which exceed a predetermined determined value can be offered permanent admission to the academic institution. In one aspect of the invention, the admissions criteria can correspond to historical performance statistics for regularly admitted students to the academic institution. For example, the historical performance statistics can be a median GPA or final exam grade for students who have completed one term or one year of study at the academic institution. Notwithstanding, the invention is no limited in this regard and any admissions criteria can suffice.

Notably, aspects of the present invention can be realized in computing system consisting of hardware, software, or a combination of hardware and software. Specifically, the method of the present invention can be realized through the use of electronic communications and transactions in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which when loaded in a computer system is able to carry out these methods. Computer program means or computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. A method for identifying and recruiting applicants for admission to a graduate school, said method comprising:

identifying a pool of standardized test takers who possess undergraduate GPA (UGPA) and standardized test score combinations that are insufficient to gain regular admission to a graduate school, wherein the identifying is performed using a computer product that correlates the test takers' UGPAs and test scores to a predetermined shifting range of UGPAs and test scores, wherein said identifying further comprises computing a shifting range of test scores and UGPAs for said test takers, and identifying those test takers having a test score and UGPA falling within said shifting range;

offering a program for admission to the graduate school to the identified test takers, wherein the program for admission includes an abbreviated academic program that includes at least two abbreviated courses from the graduate school curriculum conducted over a shortened academic term;

providing instruction in the abbreviated academic program to the test takers who accept the offer to participate in the program for admission;

administering to test takers in the program for admission at least one examination for each said abbreviated course during said abbreviated academic program;

scoring each said examination based on a calibrated grading process and using scores from each said examination to calculate a composite score for each test taker in the program for admission;

determining, via a computer, a score that correlates with a satisfactory level of academic success achieved by regularly admitted students at the graduate school;

determining which test takers achieve a composite score that exceeds the score that is determined to correlate with the satisfactory level of academic success achieved by regularly admitted students at the graduate school and therefore should be admitted into the graduate school; and admitting to the graduate school those test takers determined to have achieved a composite score that exceeds the score that is determined to correlate with the satisfactory level of academic success at the graduate school achieved by regularly admitted students at the graduate school.

2. The method of claim 1, wherein the score that is determined to correlate with the satisfactory level of academic success at the graduate school achieved by regularly admitted students at the graduate school is a composite of the final exam grades in the courses for regularly admitted students at the graduate school who have successfully completed at least one year at the graduate school.

3. The method of claim 1, wherein the graduate school is law school and the test scores are LSAT test scores, and wherein the shifting range of LSAT test scores and UGPAs comprises:

| LSAT | LSDAS GPA | Self-Reported GPA |
|---|---|---|
| 130-135 | 2.80-4.33 | 3.00-3.49, 3.50-3.74, 3.75+ |
| 136-140 | 2.60-4.33 | 3.00-3.49, 3.50-3.74, 3.75+ |
| 141-145 | 2.25-2.80 | 2.50-2.99. |

4. The method of claim 1, wherein the graduate school is a non-traditional, distance learning program.

5. The method of claim 1, wherein the satisfactory level of academic success is based on the first year median grade point average of regularly admitted students.

6. The method of claim 1, wherein the abbreviated academic program is five to seven weeks in duration.

7. The method of claim 1, wherein each said examination is administered remotely using an Internet connection.

8. The method of claim 1, wherein the abbreviated academic program is available remotely and asynchronously using an Internet connection.

9. The method of claim 1, wherein the abbreviated academic program is available remotely and is interactive.

10. The method of claim 9, wherein the interactive remotely available abbreviated academic program permits interaction between the graduate students and the instructor and among the graduate students in a chat room experience.

11. The method of claim 1, wherein the instruction is provided asynchronously and includes:
    delivering online instructional content to remotely situated test takers;
    receiving classroom work-product from said remotely situated test takers; and
    forwarding said received classroom work-product to at least one instructor.

12. The method of claim 1, wherein the instruction is provided synchronously and includes:
    delivering online instructional content to remotely situated test takers; and
    moderating online participation between said remotely situated test takers and at least one instructor.

13. The method of claim 1, wherein said administering further comprises delivering each said examination online to test takers situated in a proctored remote testing facility.

14. The method of claim 1, wherein each said examination is administered over a computer communications network.

15. The method of claim 1, wherein the abbreviated academic program is comprised of test takers seeking graduate school admission but who have not received acceptance to a graduate school of choice.

16. The method of claim 1, wherein each said examination is an essay examination.

17. The method of claim 1, wherein individuals in the pool of standardized test takers are identified as underqualified students who may nevertheless succeed in graduate school.

18. The method of claim 17, wherein the individuals in the pool of standardized test takers are solicited for participation in the program for admission without the use of generic advertising.

19. A method for identifying and recruiting applicants for admission to a law school, said method comprising:
    providing instruction in an abbreviated academic program to test takers who accept offers to participate in a program for admission to the law school, the abbreviated academic program including at least two abbreviated courses from the law school curriculum conducted over a shortened academic term, the program for admission to the law school being offered to identified test takers who possess undergraduate GPA (UGPA) and standardized LSAT test score combinations that are insufficient to gain regular admission to the law school but nonetheless fall within a predetermined shifting range of LSAT test scores and UGPAs;
    administering to test takers in the program for admission at least one examination for each said abbreviated course during said abbreviated academic program;
    scoring each said examination based on a calibrated grading process and using scores from each said examination to calculate a composite score for each test taker in the program for admission;
    determining which test takers achieve a composite score that exceeds a score that is determined, via a computer, to correlate with a satisfactory level of academic success achieved by regularly admitted students at the law school and therefore should be admitted into the law school; and
    admitting to the law school those test takers determined to have achieved a composite score that exceeds the score that is determined to correlate with the satisfactory level of academic success at the law school achieved by regularly admitted students at the law school.

20. The method of claim 19, wherein the score that is determined to correlate with the satisfactory level of academic success at the law school achieved by regularly admitted students at the law school is a composite of the final exam grades in the courses for regularly admitted students at the law school who have successfully completed at least one year at the law school.

21. The method of claim 20, wherein the shifting range of LSAT test scores and UGPAs comprises:

| LSAT | LSDAS GPA | Self-Reported GPA |
|---|---|---|
| 130-135 | 2.80-4.33 | 3.00-3.49, 3.50-3.74, 3.75+ |
| 136-140 | 2.60-4.33 | 3.00-3.49, 3.50-3.74, 3.75+ |
| 141-145 | 2.25-2.80 | 2.50-2.99. |

22. The method of claim 19, wherein the satisfactory level of academic success is based on the first year median grade point average of regularly admitted students.

23. The method of claim 19, wherein at least some of the instruction is provided asynchronously and includes:
    delivering online instructional content to remotely situated test takers;
    receiving classroom work-product from said remotely situated test takers; and
    forwarding said received classroom work-product to at least one instructor.

24. The method of claim 19, wherein at least some of the instruction is provided synchronously and includes:
    delivering online instructional content to remotely situated test takers; and
    moderating online participation between said remotely situated test takers and at least one instructor.

25. The method of claim 23, wherein at least some of the instruction is provided synchronously and includes:
    delivering online instructional content to remotely situated test takers; and moderating online participation between said remotely situated test takers and at least one instructor.

26. The method of claim 19, wherein each individual among those standardized test takers who are made offers to participate in the program for admission to the law school is identified as being an underqualified student who may nevertheless succeed in law school.

27. The method of claim 26, wherein the individuals are solicited for participation in the program for admission without the use of generic advertising.

28. A method for identifying and recruiting applicants for admission to a graduate school, said method comprising:

providing instruction in an abbreviated academic program to test takers who accept offers to participate in a program for admission to the graduate school, the abbreviated academic program including at least two abbreviated courses from the graduate school curriculum conducted over a shortened academic term, the program for admission to the graduate school being offered to identified test takers who possess undergraduate GPA (UGPA) and standardized test score combinations that are insufficient to gain regular admission to the graduate school but nonetheless fall within a predetermined shifting range of test scores and UGPAs;

administering to test takers in the program for admission at least one examination for each said abbreviated course during said abbreviated academic program;

scoring each said examination based on a calibrated grading process and using scores from each said examination to calculate a composite score for each test taker in the program for admission;

determining which test takers achieve a composite score that exceeds a score that is determined, via a computer, to correlate with a satisfactory level of academic success achieved by regularly admitted students at the graduate school and therefore should be admitted into the graduate school; and admitting to the graduate school those test takers determined to have achieved a composite score that exceeds the score that is determined to correlate with the satisfactory level of academic success at the graduate school achieved by regularly admitted students at the graduate school, wherein the score that is determined to correlate with the satisfactory level of academic success at the graduate school achieved by regularly admitted students at the graduate school is a composite of the final exam grades in the courses for regularly admitted students at the graduate school who have successfully completed at least one year at the graduate school, and wherein each individual among those standardized test takers who are made offers to participate in the program for admission to the graduate school is identified as being an underqualified student who may nevertheless succeed in graduate school.

29. The method of claim 28, wherein at least some of the instruction is provided:

(a) synchronously and includes delivering online instructional content to remotely situated test takers, and moderating online participation between said remotely situated test takers and at least one instructor, and/or (b) asynchronously and includes delivering online instructional content to remotely situated test takers, receiving classroom work-product from said remotely situated test takers, and forwarding said received classroom work-product to at least one instructor.

30. The method of claim 28, wherein the graduate school is law school and the test scores are LSAT test scores, the graduate school is medical school and the test scores are MCAT test scores, or the graduate school is business school and the test scores are GMAT test scores.

* * * * *